F. P. GRUETZNER.
HORIZONTAL ENGINE.
APPLICATION FILED APR. 7, 1916.

1,246,262.

Patented Nov. 13, 1917.

Inventor
Fritz P. Gruetzner
By his Attorneys

UNITED STATES PATENT OFFICE.

FRITZ PAUL GRUETZNER, OF NEW ROCHELLE, NEW YORK, ASSIGNOR TO DE LA VERGNE MACHINE COMPANY, OF NEW YORK, N. Y., A CORPORATION OF NEW YORK.

HORIZONTAL ENGINE.

1,246,262.   Specification of Letters Patent.   Patented Nov. 13, 1917.

Application filed April 7, 1916. Serial No. 89,552.

*To all whom it may concern:*

Be it known that I, FRITZ PAUL GRUETZ-NER, a citizen of Germany, and a resident of New Rochelle, in the county of Westchester and State of New York, have invented certain new and useful Improvements in Horizontal Engines.

My invention concerns the structure of crank-shaft bearings in horizontal engines and the relation of the engine frame thereto whereby the latter is better adapted to withstand the thrust of the piston and whereby other advantages are attained as hereinafter made apparent.

Figure 2:
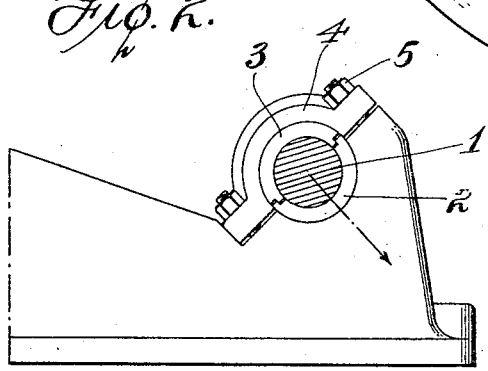
Fig. 2 illustrates for comparison, the type of horizontal engine crankshaft bearing which is most common in the art.

Referring first to Fig. 2, the engine frame there shown may be understood to be that of an internal combustion engine to which class my invention specially pertains. The crankshaft 1 thereof is journaled on two semi-cylindrical bearings or so-called brasses, of which the lower brass 2 is bedded firmly in the bottom of the crank-shaft notch in the engine frame and the upper brass, 3, is clamped against the shaft and toward the lower one, by a cap 4 and its bolts or nuts 5. Under the working thrust of the piston, which is approximately horizontal, and the weight of the crank-shaft and flywheel, which is vertical, the wear of the bearing takes place in a resultant, obliquely downward direction as indicated roughly by the dotted line, and for this reason it is customary to dispose the proximate faces of the cap and frame, as well as of the brasses, in a plane which is perpendicular to said line so that the bolts 5 will be parallel therewith and the upper brass can thus be advanced toward the other in the direction of the wear and as the wear takes place. This common construction has the objection that a weak point is produced on the frame at the crank-shaft notch or immediately in front of it due to the diminished vertical dimensions caused by the notch itself or made necessary in order to accommodate the inclination of the journal cap in the position stated, and fracture at this point is not an uncommon occurrence and always entails expensive consequences. Lateral increase of the frame thickness is not practicable on account of clearance requirements and for obvious reasons.

Figure 1:
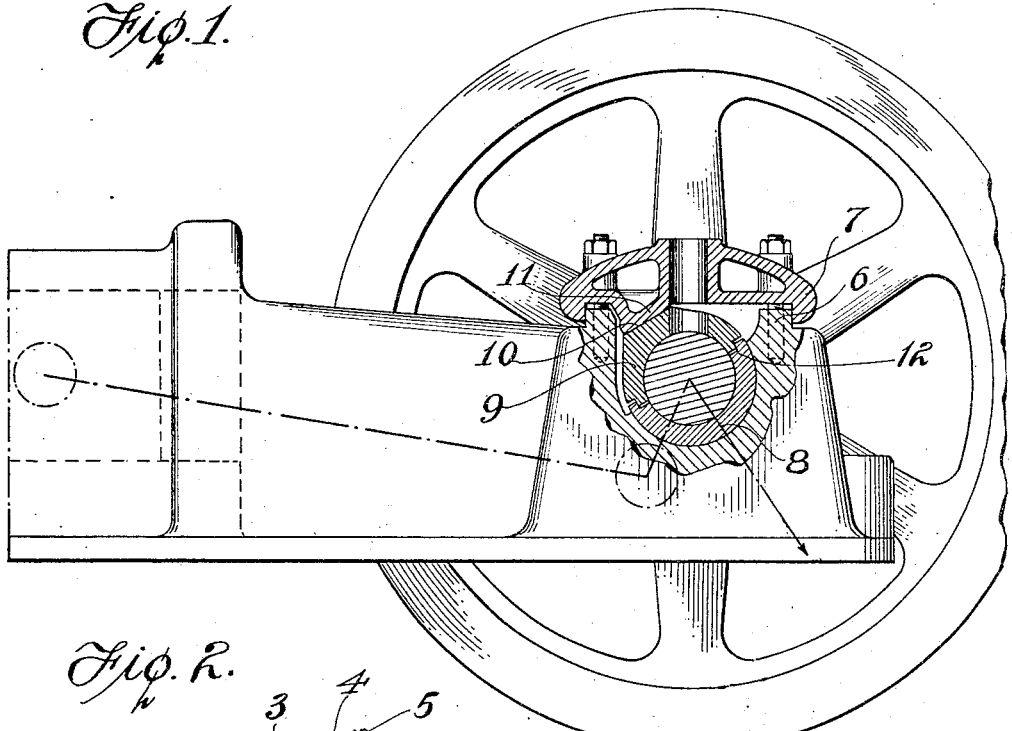
Figure 1 illustrates the invention in simple form.

My invention avoids the objection noted by mounting the bearings or brasses in a notch in the frame which has its opening or entrance faced upwardly and above the level of the shaft axis and in such inclination to the line of wear as not to involve appreciable encroachment upon the metallic cross-section of the frame intervening between the shaft and cylinder. In Fig. 1 the notch is a substantially U-shaped slot with vertical side walls terminating in heavy upstanding lugs 6 and the journal cap has terminal hook-shaped flanges 7 embracing these lugs and adapted to tie the opposite walls of the notch together so that the reduced section immediately below the shaft is thereby adequately reinforced. The lower brass 8 (of any suitable material) is seated in the notch with its edges in a plane or planes perpendicular to the line of wear and the upper brass 9, fitted thereon, has a slabbed face 10 also perpendicular to the line of wear and adapted to be engaged by the wedge surface of a part 11 which projects from the cap into the notch. The cap bolts threaded into the lugs 6, the same being parallel with the outer faces of the lugs, serve to tighten the cap upon the notch in a direction which is downward and also oblique or transverse to the line of wear. Through the action of the wedge surface each tightening advances the upper brass toward the other in the direction of the line of wear. The upper brass is desirably guided in such movement otherwise than by engagement with the shaft as by rabbeting the meeting edges of both brasses as indicated at 12 but it may be correlated to the lower brass or other parts in any suitable way so that the tightening of the bolts will advance it properly as the wear takes place.

Figure 3:
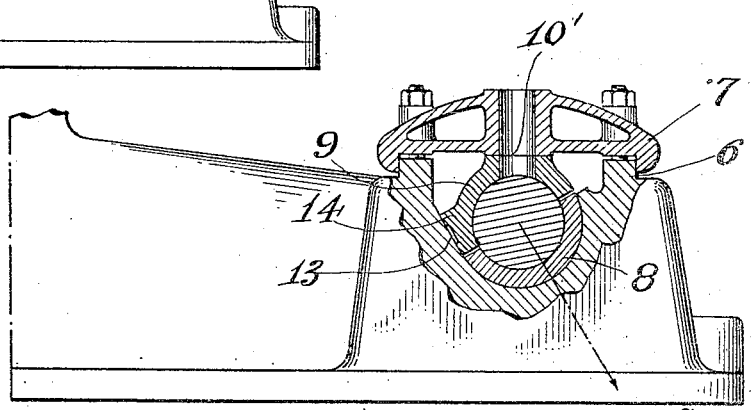
Fig. 3 is a modification illustrating the scope of the invention.

Fig. 3 illustrates the transposition of the wedge surface to the side wall of the notch, the engagement of the upper brass with the cap, in this case, being between the top surface of the brass which is parallel with the cap. The proper advance of the brass is determined by the inclination of the wedge surface 13 upon which the brass is guided by the engagement therewith of its projecting part or parts 14, while otherwise the structure and operation is the same as already described. Between the crank-shaft and the engine cylinder there is no point of weakened section and the weakness incidental to the depth of the notch is compensated by the tensile strength of the cap which of course can be easily made of any necessary cross-section.

It will thus be apparent to those skilled in the art that the essential features of the invention comprise the upper brass advanced in the line of wear by the tightening of the cap in a downward direction, oblique or transverse to such line, and so as to avoid or compensate the weakening of that part of the frame which constitutes the pillow for the bearing, and that in other respects, including the oiling facilities, the parts may be constructed according to preference. The vertical apertures in the caps and brasses shown in the drawing are for lubrication but any lubricating system can obviously be applied.

The invention is claimed as follows:

1. The combination of a horizontal engine frame having a crank-shaft notch with its entrance faced vertically upward and disposed above the crank-shaft therein, a journal cap covering such notch and adapted to be tightened thereon in a direction oblique or transverse to the line of wear of the bearing surfaces, and a brass or bearing in said notch advanced by the cap in the direction of the line of wear.

2. The combination of a horizontal engine frame having a crank-shaft notch with its entrance faced in a direction oblique to the line of wear of the crank-shaft bearings and its upper margins formed by upstanding parts, a journal cap clasping said parts, and thereby tying the walls of the margin together and adapted to be tightened on said notch in a direction oblique to said line of wear, and a journal brass advanced by the cap in the direction of said wear.

3. The combination of a horizontal engine frame having a crank-shaft notch with its entrance faced in an upward direction, oblique to the line of wear of the crank-shaft bearing, a journal cap having terminal flanges uniting the opposite walls of said notch and adapted to be tightened thereon in a direction oblique to the said line of wear and a journal brass engaged by a wedge surface to advance in the direction of the line of wear as the cap is tightened.

In testimony whereof, I have signed this specification.

FRITZ PAUL GRUETZNER.

Copies of this patent may be obtained for five cents each, by addressing the "Commissioner of Patents, Washington, D. C."